United States Patent [19]

Winter

[11] Patent Number: 4,702,670

[45] Date of Patent: Oct. 27, 1987

[54] GAS TURBINE ENGINES

[75] Inventor: John L. Winter, Derby, England

[73] Assignee: Rolls-Royce, London, England

[21] Appl. No.: 28,047

[22] Filed: Mar. 20, 1987

Related U.S. Application Data

[63] Continuation of Ser. No. 815,060, Dec. 31, 1985, abandoned.

[30] Foreign Application Priority Data

Feb. 12, 1985 [GB] United Kingdom ................ 8503606

[51] Int. Cl.$^4$ ............................................ F01D 11/02
[52] U.S. Cl. .................................... 415/116; 415/115
[58] Field of Search ............... 415/115, 116, 117, 114, 415/175, 172 R, 172 A, 169 R, 169 A, 180

[56] References Cited

U.S. PATENT DOCUMENTS

| | | | |
|---|---|---|---|
| 3,746,462 | 7/1973 | Fukuda | 415/172 A |
| 3,836,279 | 9/1974 | Lee | 415/116 |
| 3,975,901 | 8/1976 | Hallinger et al. | 415/117 |
| 4,161,318 | 7/1979 | Stuart et al. | 415/172 A |
| 4,353,679 | 10/1982 | Hauser | 415/115 |
| 4,403,917 | 9/1983 | Laffitte et al. | 415/115 |
| 4,447,190 | 5/1984 | Campbell | 416/95 |
| 4,522,557 | 6/1985 | Bouiller et al. | 415/116 |

FOREIGN PATENT DOCUMENTS

| | | | |
|---|---|---|---|
| 551700 | 4/1956 | Italy | 415/116 |
| 8203 | 1/1983 | Japan | 415/115 |
| 165802 | 9/1984 | Japan | 415/115 |
| 229933 | 2/1944 | Switzerland | 415/114 |
| 1381277 | 8/1972 | United Kingdom | 415/116 |
| 1553701 | 10/1979 | United Kingdom | 415/117 |
| GB2111598 | 7/1983 | United Kingdom . | |

Primary Examiner—Robert E. Garrett
Assistant Examiner—John T. Kwon
Attorney, Agent, or Firm—Cushman, Darby & Cushman

[57] ABSTRACT

The cooling air from the nozzle guide vanes of a gas turbine engine is discharged from one or both platforms to discourage leakage flow between rotating and static components of the engine.

In the case of the outboard platform the cooling air is discharged towards the engine casing to flow through the clearance between the shroud of the engine casing and the shroud of the turbine blades. This arrangement reduces the leakage flow of gas from the main gas stream and assists in reducing casing temperatures.

3 Claims, 4 Drawing Figures

GAS TURBINE ENGINES

This is a continuation of application Ser. No. 815,060, filed Dec. 31, 1985 and now abandoned.

This invention relates to gas turbine engines, and is particularly concerned with the discharge of cooling air from cooled components of the engine. The discharged cooling air will be at an elevated temperature, as it will have been heated during its passage through the component being cooled, and it is important that this air is discharged into the engine gas stream without adverse effect on engine performance. Thus it should not increase specific fuel consumption or reduce the life of any component.

The present invention seeks to provide a means of discharging cooling air from a cooled component to enable the discharged cooling air to provide further cooling and a sealing function.

Accordingly the present invention provides a gas turbine engine including a circumferential array of stator vanes and a circumferential array of adjacent downstream rotor blades, mounted in a rotor, the rotor blades being enclosed within a casing with a radial clearance between the blades and the casing each stator vane having at least one platform, the at least one platform comprising two layers spaced apart to define a passage for the throughflow of cooling air, the downstream end of the passage including means to direct the discharged relatively high temperature, cooling air away from the downstream rotor blades and into the leakage gas flow between the rotor portion corresponding to the said at least one platform of the stator vane, and a static portion of the engine.

In one arrangement, according to the invention, the stator vane comprises the nozzle guide vane of a gas turbine engine, and the said at least one platform comprises the outboard platform of the vane. The platform comprises two layers spaced apart by lands or pedestals defining the cooling air flow passage through which flows air derived from the compressor of the engine. The downstream end of the passage is shaped to discharge the cooling air flow at an angle to the platform surface so that the discharged cooling air flow passes into the clearance between the rotor blades and the rotor blade casing.

The invention can be applied to the inboard vane platform as well as, or instead of, the outboard platform. If applied to the inboard platform the cooling flow can be directed so as to oppose any flow of leakage air which may leak through an inboard seal between the static and rotating components of the turbine.

The present invention will now be more particularly described with reference to the accompanying drawings in which FIG. 1 is a schematic illustration of a gas turbine engine according to the present invention.

Figure 1:
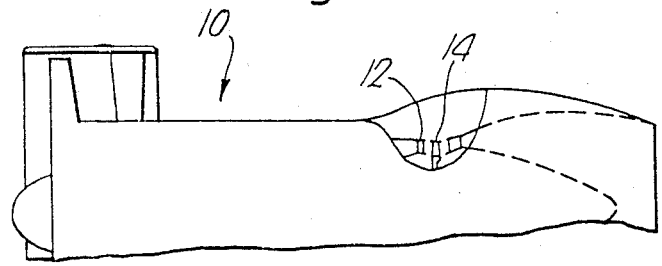

Referring to the drawings, a turbo-fan type gas turbine engine is of conventional form and includes a fan, compressors, combustion chamber, compressor driving turbine, and fan driving turbine. At the exit of the combustion chamber is a circumferential array of nozzle guide vanes 12 and an adjacent circumferential array of high pressure turbine blades 14.

Figure 2:
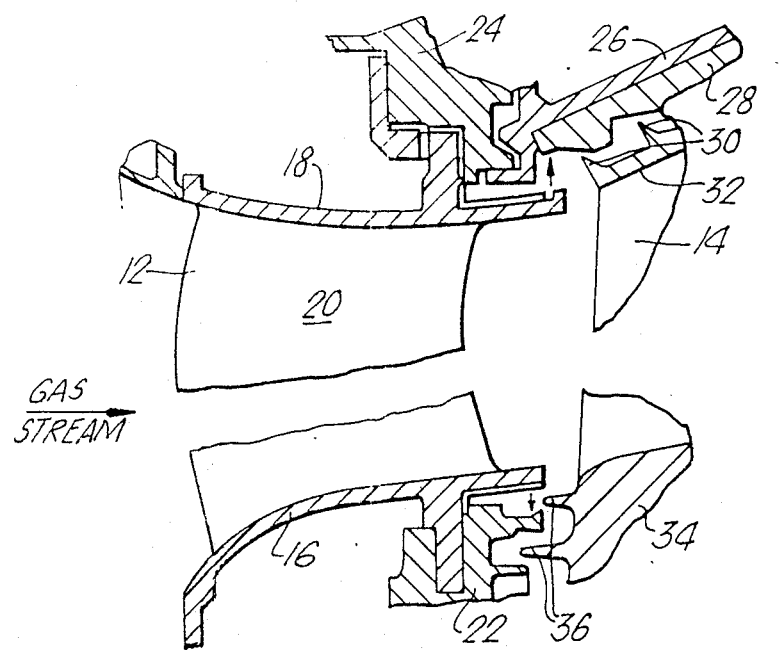
FIG. 2 shows in part the nozzle guide vane and high pressure turbine blade of the engine shown in FIG. 1.

Referring to FIG. 2, the nozzle guide vanes have inboard and outboard platforms 16 and 18 respectively, connected by a flow directing aerofoil section portion 20. The vanes are secured in position between inner and outer housings 22 and 24, the outer housing being connected to a turbine casing 26. The casing 26 includes an annular shroud 28 formed in segments which cooperates with fins 30 on shroud 32 of each blade 14. The fins 30 and segmented shroud form a seal for the clearance between the blade shroud and engine casing. The blade 14 has a root 34 having annular sealing fins 36 which cooperate with part of the inner housing 22 to prevent a leakage flow of air into the gas stream. The vanes receive the flow of hot gases from the combustion chamber for discharge into the high pressure turbine, and as a consequence operate at very high temperatures. In order to keep the material of the vanes at an acceptable temperature, most parts of the vane including the platforms are cooled by a flow of air taken from a compressor of the engine. This cooling air passes through passages formed internally of the vane and is discharged at a high temperature internally of the engine.

Figure 3:
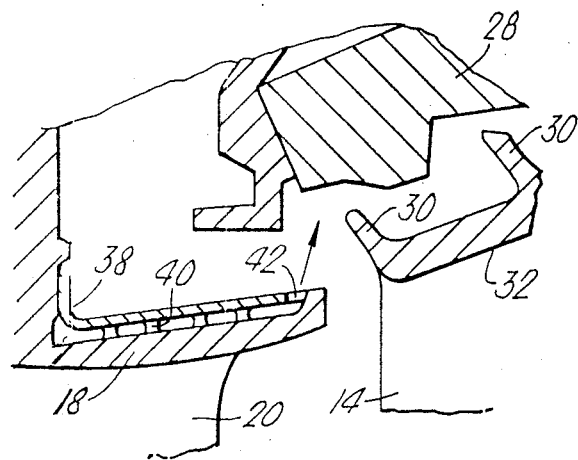
FIG. 3 shows in greater detail the outboard portions of the nozzle guide vane and high pressure turbine blade shown in FIG. 2.
Figure 4:
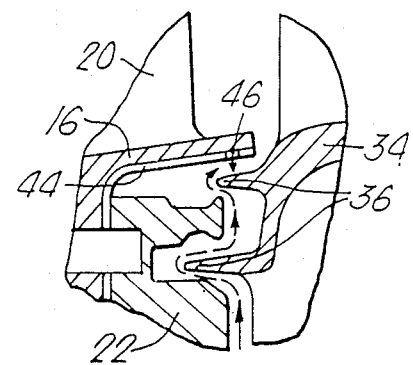
FIG. 4 shows in greater detail the inboard portions of the nozzle guide vane and high pressure turbine blade shown in FIG. 2.

Referring more particularly to FIG. 3, the downstream section of the outboard platform 18 is provided with a skin 38 which is attached to the outboard platform and spaced from the platform 18 by pedestals 40. The skin 38 and the platform 18 thus define a passageway for the throughflow of air drawn from the engine compressor, to cool the outboard platform. The cooling air is discharged from the platform 18 through a series of circumferentially disposed slots 42 towards the shroud 28 and into the clearance between the shroud 28 and the blade shroud 32. The discharged cooling air, although it is at a relatively high temperature, is still cool enough to provide some cooling of the shroud 28. The flow of the discharged cooling air through the clearance also tends to discourage leakage of the main gas stream through the clearance.

The invention can be applied in a similar manner to the inboard platform 16. In this case the platform has a skin 44 which with the platform defines a passageway for the throughflow of cooling air. The cooling air discharges through a series of openings 46 into the leakage flow past the sealing fins 36, indicated by the dashed line and arrows.

The discharged cooling air mixes with the leakage flow, and tends to reduce the leakage flow, and thereby reduce the penalty caused by leakage flow into the main gas stream.

It will be appreciated that the arrangements according to the present invention, make use of the cooling air discharged from the nozzle guide vanes to cool the engine casing, and to discourage the leakage of air into the gas stream, and the leakage of the main gas stream over the rotor blade tips. It has been shown that the temperature of the casing in the region of the air discharged from the nozzle guide vane outboard platform can be reduced significantly. This temperature reduction is due to the combined effect of cooling by the discharged cooling air, and a reduction of leakage flow of relatively hot gas from the main gas stream over the tips of the rotor blades.

I claim:

1. A gas turbine engine including a circumferential array of stator vanes, a rotor, a circumferential array of adjacent downstream rotor blades mounted in said rotor, and a casing including an inner and outer housing, the rotor blades being enclosed within said casing with a radial clearance between the blades and the casing, each stator vane having at least one platform, the at least one platform comprising two layers spaced apart to define a passage for the through flow of cooling air from a source of cooling air which is separate and distinct from a main gas flow and that is directed on to the circumferential array of stator vanes, a downstream end of said passage including means for directing the discharged relatively high temperature cooling air away from said rotor blades and into a leakage flow between a rotor portion corresponding to said at least one platform of the stator vane and a static portion of the engine, said leakage flow comprising a space between a said stator blade and said casing, with said discharge being oriented toward said casing so as to reduce gas flow leakage therebetween.

2. An engine as claimed in claim 1 in which said stator vanes comprise nozzle guide vanes, said rotor blades comprise blades of a high pressure turbine, said static portion of the engine comprises said casing, said at least one platform comprises an outboard platform of each of said nozzle guide vanes, and each said platform comprises two layers spaced apart by pedestals to define said cooling air flow passage, said downstream end of said passage being shaped so as to discharge the cooling air through a series of circumferential slots at an angle relative to the platform surface, towards said casing.

3. An engine as claimed in claim 1 in which each stator vane has an outboard and an inboard platform, each platform comprising two layers spaced apart to define a passage for the throughflow of cooling air, a downstream end of each said passage including means for directing the discharged cooling air away from said rotor blades and into a leakage gas flow over a rotor portion corresponding to each of said platforms of each said stator vane.

* * * * *